US008293932B2

(12) United States Patent
Krumbholz et al.

(10) Patent No.: US 8,293,932 B2
(45) Date of Patent: Oct. 23, 2012

(54) PROCESS FOR EXTRACTING A SUBSTANCE OR A SUBSTANCE GROUP FROM A MIXTURE

(75) Inventors: Rudolf Krumbholz, Holving (FR); Peter Lembke, Spiesen-Elversberg (DE)

(73) Assignee: K.D. Pharma GmbH, Bexbach (DE)

( * ) Notice: Subject to any disclaimer, the term of this patent is extended or adjusted under 35 U.S.C. 154(b) by 0 days.

(21) Appl. No.: 11/479,538

(22) Filed: Jun. 30, 2006

(65) Prior Publication Data
US 2006/0247455 A1 Nov. 2, 2006

(51) Int. Cl.
*C11B 3/00* (2006.01)
(52) U.S. Cl. ........................................ 554/191
(58) Field of Classification Search ................ 554/175, 554/191
See application file for complete search history.

(56) References Cited

U.S. PATENT DOCUMENTS
5,362,895 A * 11/1994 Engelhardt et al. ........... 554/175
* cited by examiner

*Primary Examiner* — Deborah D Carr
(74) *Attorney, Agent, or Firm* — Lucas & Mercanti, LLP; Klaus P. Stoffel

(57) ABSTRACT

A process for extracting a substance or a substance group from a mixture utilizes a solvent for separation. The mixture is treated with the solvent in the presence of a sorbent as the stationary phase, wherein the solvent is conducted past the sorbent in a co-current flow with the mixture or in a counter-current flow against the mixture, or wherein the solvent is conducted past the non-moving mixture and the sorbent. The solvent and the sorbent are selected such that the holding effect of the sorbent supports the separation by the solvent during the separation procedure and/or subsequently supplements the separation by interacting with the solvent as the mobile phase.

22 Claims, 5 Drawing Sheets

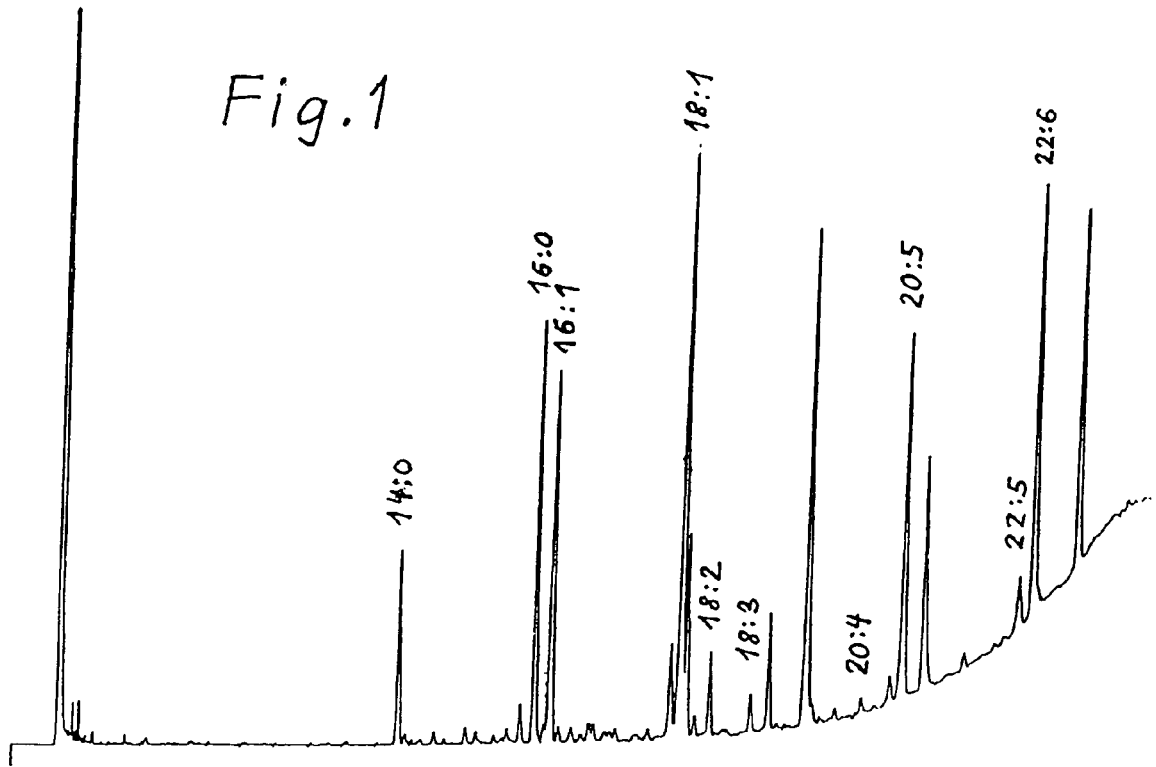

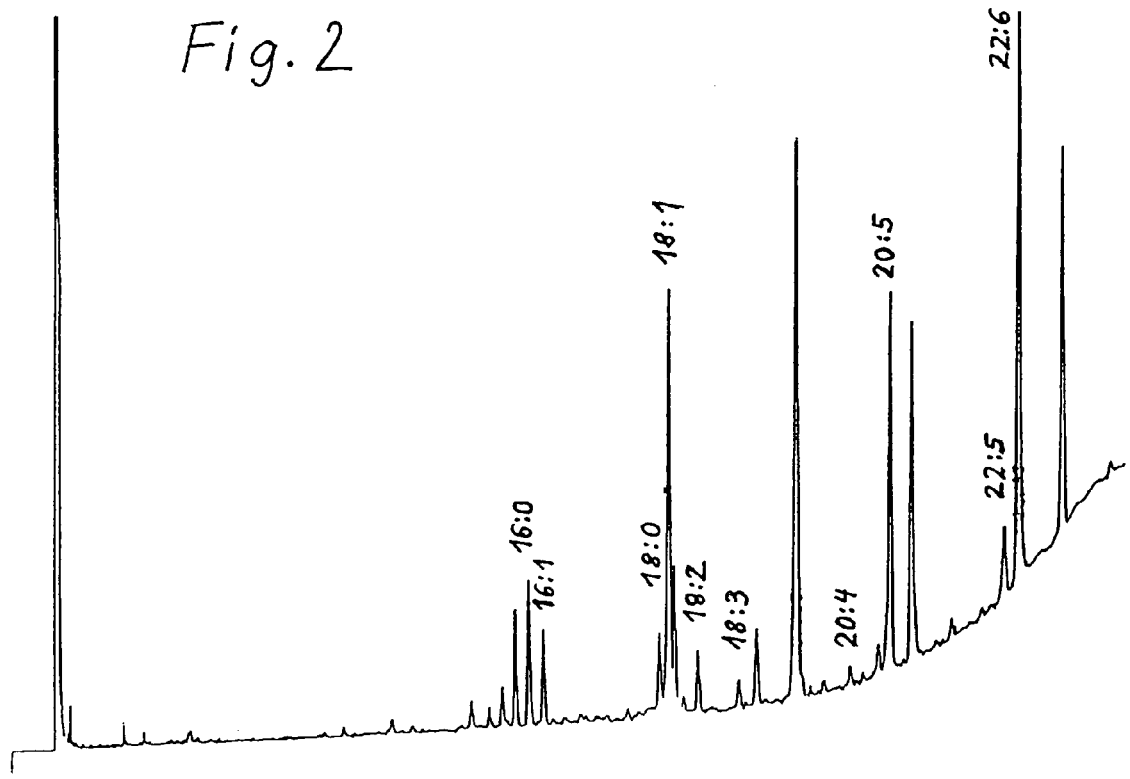
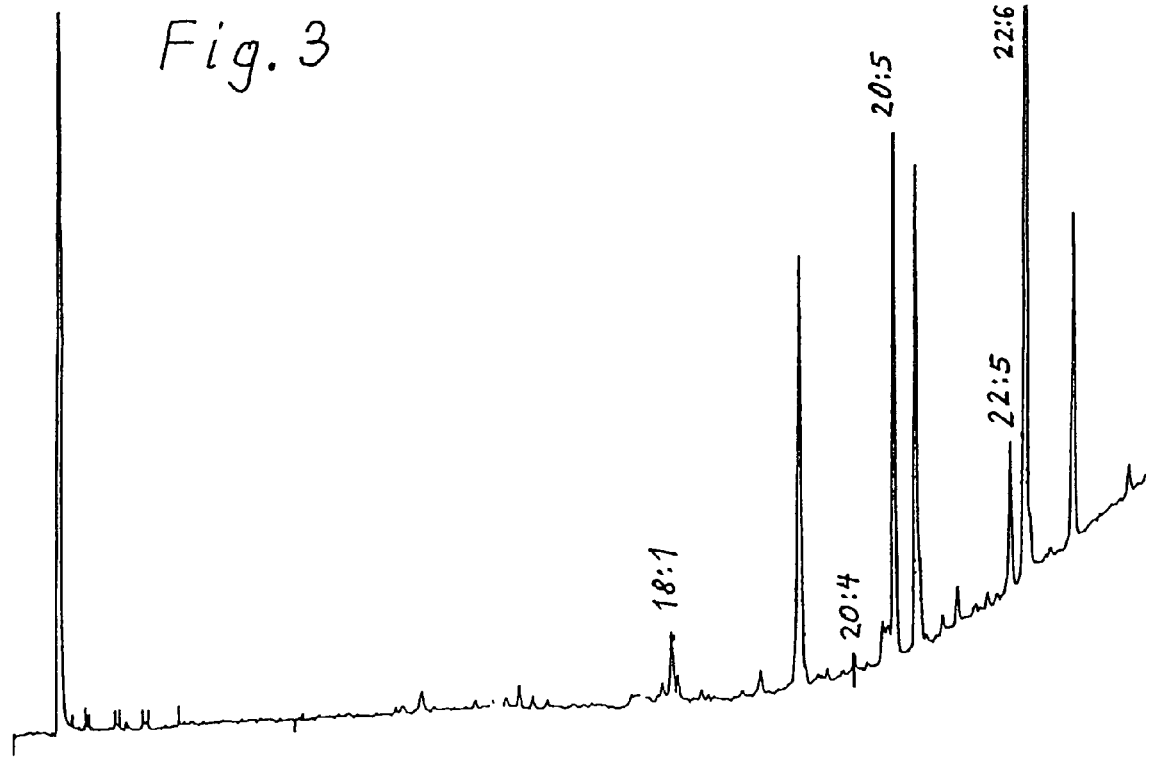

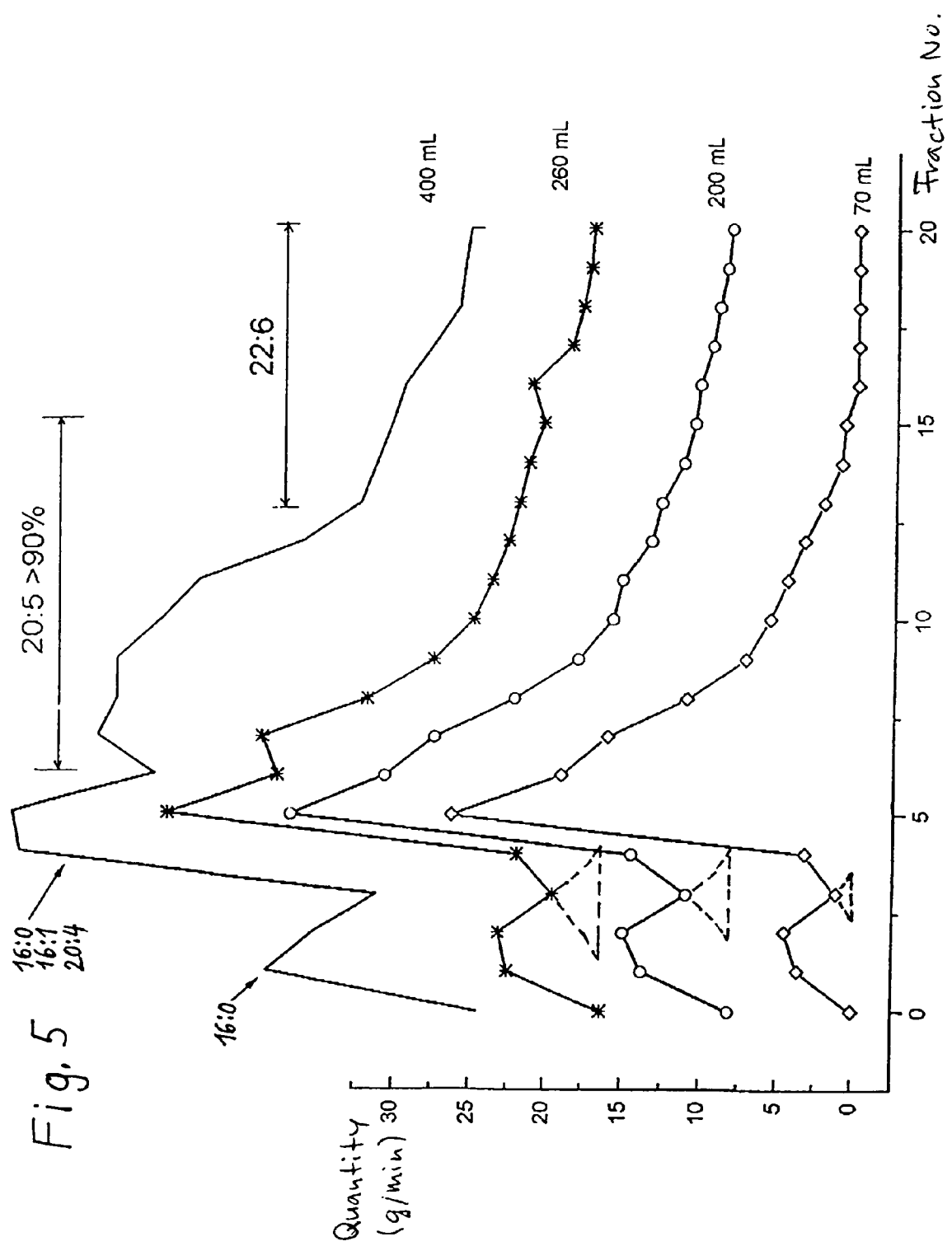

PROCESS FOR EXTRACTING A SUBSTANCE OR A SUBSTANCE GROUP FROM A MIXTURE

BACKGROUND OF THE INVENTION

1. Field of the Invention

The present invention relates to a process for extracting a substance or a substance group from a mixture, wherein the process utilizes a solvent for separation.

2. Description of the Related Art

A process of this type is known in the art as the extraction by means of a selective solvent, i.e., a solvent which either separates the substance or the substance group to be extracted or which leaves the substance or substance group to be extracted in the residue.

The efficiency of the extraction is frequently limited with respect to its selectivity because, when extracting the soluble substance or substances, molecules of other substances which are normally not soluble in the solvent under the adjusted conditions, are also taken into the solution; in addition, the differences in the solubility between the substances to be separated are already small from the outset.

The efficiency of the extraction is also limited because of the fact that it practically always only makes possible a separation between soluble substances and non-soluble substances.

SUMMARY OF THE INVENTION

Therefore, it is the primary object of the present invention to provide a more efficient separating process.

In accordance with the present invention, the mixture is treated with the solvent in the presence of a sorbent as the stationary phase, wherein the solvent is conducted past the sorbent in a co-current flow with the mixture or in a counter-current flow against the mixture, or wherein the solvent is conducted past the non-moving mixture and the sorbent, and wherein the solvent and the sorbent are selected such that the holding effect of the sorbent supports the separation by means of the solvent during the separation procedure and/or subsequently supplements the separation by interacting with the solvent as the mobile phase.

The embodiment of the invention in which the solvent is conducted past the non-moving mixture constitutes the technological process of extraction.

The sorbent used in accordance with the invention can be selected such that it binds those molecules which can otherwise be taken into the solution, or even those molecules of substances which are normally soluable in the solvent and which are not intended to be separated. The sorbent can and should preferably bind the molecules already prior to the separating procedure directly from the mixture, so that the molecules are not being dissolved from the outset: the extraction is supported by the sorbent. However, it is also possible alternatively, or preferably additionally, to immediately remove the already dissolved molecules from the solution by binding the molecules the sorbent interacting with the appropriately selected solvent as the mobile phase.

The binding may be permanent, i.e., until the removal of the residue in which the sorbent can be separated from the sorbent. However, an only temporary binding also has an already very advantageous effect.

In any event, the selectivity is improved.

The embodiment of the invention in which the solvent is conducted in a counter-current flow to the mixture constitutes the technological process of the continuous counter-current flow extraction.

In that case, the sorbent can bind the respective molecules only temporarily, whether from the mixture or from the solution or both, because in the final result the respective molecules should be discharged together with the residue. The selectivity of the counter-current flow extraction is increased also in this embodiment of the invention.

The embodiment of the invention in which the solvent is conducted in a co-current flow with the mixture constitutes basically a novel manner of carrying out the process of extraction.

While, as a rule, the above-discussed embodiments of the extraction and the counter-current flow extraction will also in accordance with the invention be carried out with a solvent which selectively only separates a substance or a substance group and, thus, the mixture will be separated into two fractions, the novel treatment in the co-current flow provides as a rule that the mixture is added in batches with the use of a solvent which is capable, at different speeds, of separating several substances or substance groups to be separated and the mixture is separated into several fractions in a co-current flow with the solvent.

As is the case in the two other embodiments of the process according to the present invention which modify the extraction and the counter-current flow extraction, in the embodiment mentioned last which is closest to the preparative chromatography, a substance or a substance group is preferably held through a direct influence on the mixture by an appropriate selection of the sorbent and the solvent, so that the entry of the substance or substance group into the solution is delayed, and, after entry into the solution, the substance or substance group is once again held in the known manner of chromatography by a change between stationary and mobile phases, so that the further passage of substance or substance group is delayed. However, depending on the conditions, already only one of the procedures may provide the result that substances or substance groups of consecutively collected fractions are separated to a satisfactory extent which can otherwise not be achieved.

Starting from chromatography, this manner of operation can also be considered a chromatography which is supported by a qualitatively progressing extraction.

The productivity of the preparative chromatography can be significantly increased in this manner, as will be discussed in more detail below. Consequently, the efficiency is increased in accordance with the object of the present invention.

The process according to the present invention differs from conventional chromatography essentially in that the quantity added is increased by a multiple. Chromatography is understood to be a two-phase system including a liquid, gaseous or supercritical mobile phase and a fixed stationary phase. The mixture to be separated must be dissolved in the mobile phase. The molecules of the mixture must be capable of moving between mobility in the mobile phase and being deposited to the stationary phase.

The quantity of the mixture which, in accordance with the present invention, is added to the mobile phase, for example, supercritical carbon dioxide, usually above or below a column which has a framework covered by the sorbent, is not separated at the latest when reaching the column. The quantity of the mixture forms at the beginning of the column a "plug" of at least 2%, or better 5-10%, or more, of the column length between the mobile phase which previously had flowed into the column and the mobile phase which subsequently flows in. The plug is loosened to the extent that the added mixture is pressed into the framework by the mobile phase which flows in subsequently, however, it is nevertheless initially a plug.

Even without the holding effect of the sorbent on a substance or substance group, the separation of the different substances of the mixture takes place in the mixture at different speeds depending on the solubility of the substances. The more easily soluble substances are dissolved first. For example, in the case of a mixture of aliphatic hydrocarbon compounds, the compound having the shortest chain length is dissolved first, then the compound having the next greatest chain length, and so forth.

During the passage through the column caused by the flow of the mobile phase, areas of different concentration of the various substances are expanded. This would not be sufficient for a separation and a consecutive separate collection of the various substances at the entry of the column.

However, the effect is superimposed by the concurrent effect of the chromatography. By the way, aside from its selective effect on an individual substance or a substance group, chromatography can also expand with a suitable sorbent the compounds in accordance with their chain length. Chromatography starts simultaneously with the progressing dissolution of the plug in the mobile phase. Where the sorbent is in contact with the solution, the dissolved molecules start to interact between the solution as the mobile phase and the sorbent as the stationary phase. In a vertical range of the column between the as yet undissolved plug and the final pure solution, the undissolved mixture and the solution exist in distribution closely next to one another. Accordingly, already this vertical range of the column is already utilized for chromatography. A more or less high lower area of pure chromatography can follow, however, this is not absolutely required.

The preparative chromatography is usually by itself capable of carrying out the separation to a satisfactory extent, and it actually becomes less accurate when it is overburdened. However, as recognized and to be utilized in accordance with the invention, when superimposed with the effect of the qualitatively progressing extraction, the fractions obtainable by the chromatography can be, at least over portions, expanded up to twofold and more. This is certainly true when the sorbent is also already effective immediately in the mixture, as it is usually the case.

This makes possible a drastic increase of the throughput quantities, i.e., of the productivity.

It is also a decisive factor that the increased expansion of substances of different solubility, and possibly absorbility, can also aid in the pure chromatographic separation of different substances having the same solubility, for example, fatty acids having equal numbers of carbon atoms and different degrees of saturation. The interaction of the molecules between the mobile phase and the stationary phase can take place more freely when other molecules have already been removed and the total concentration has been reduced accordingly.

A particularly advantageous further development of the invention resides in its use in combination with the methods known from DE 42 06 539 A1 and EP 0 558 974 A1 for obtaining unsaturated fatty acids and/or compounds of such fatty acids, i.e., with a sorbent which has on at least one group of its molecule or its molecules at least one free pair of electrons and/or which has in its molecule or in its molecules at least one multiple bond, wherein, after the passage of the possibly present saturated fatty acid or fatty acid compound having the same number of carbon atoms through the column, the fatty acids and/or fatty acid compounds are collected by themselves or in an enriched mixture.

The two measures supplement each other. The qualitatively progressing extraction supports the separation in accordance with the solubility; the sorbent with the free pair of electrons and/or the multiple bond separates the fatty acids having the same solubility but different degrees of saturation.

The technical operation of the normal extraction is essentially also possible in the combination of the qualitatively progressing extraction with the chromatography. This is particularly applicable to solids which cannot be easily fed into a system which is under pressure.

The solvent and simultaneously the mobile phase can be, in addition to carbon dioxide, the solvents usually used for extraction or chromatography either in pure form or in a mixture, for example, hexane, dichloromethane, methanol, ethanol, and the fluids sulphur hexafluoride, propane, dinitrogen monoxide, supercritical water.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIGS. 1-4 and 6-8 are chromatograms of different compositions; and

FIG. 5 is a diagram showing the results of four experiments.

DETAILED DESCRIPTION OF THE INVENTION

Figure 4:
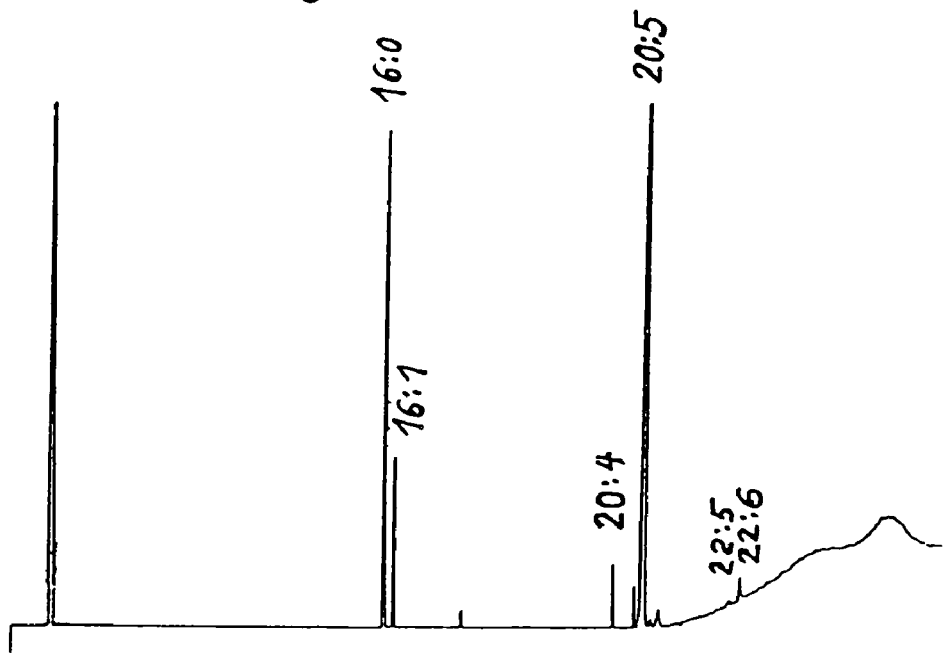

The invention will now be described in more detail with the aid of the following examples.

EXAMPLE 1

A mixture in which the unsaturated fatty acids arachidonic acid (20:4), eicosapentene acid (20:5), docosapentene acid (22:5) and docosahexene acid (22:6) were enriched was extracted from a fish-liver oil ethyl ester.

The extraction was carried out in the counter-flow process with supercritical carbon dioxide under a pressure of 135 bars and a temperature of 57° C. in a column having a diameter of 4.5 cm and a height of 300 cm and provided with a high-grade steel Sulzer packing. The flow rate of the carbon dioxide conducted through the column from the bottom towards the top was 20 kg/h. The fish-liver oil ethyl ester was fed in at a height of approximately 200 cm at a rate of 0.54 kg/h.

FIG. 1 shows in a gas chromatogram the analysis of the fish-liver oil ethyl ester. The more important acids are identified by their conventional system of notation, i.e., number of carbon atoms: number of double bonds. The portions of the acids expressly mentioned above were 20:4 0.5% by weight
20:5 8.9% by weight
22:5 1.3% by weight
22:6 10.5% by weight.

After the normal counter-current flow extraction, the portions in the residue were, as illustrated in FIG. 2, 20:4 0.9% by weight
20:5 11.0% by weight
22:5 2.1% by weight
22:6 15.4% by weight.

The extraction was repeated with a packing of the column with 60 cm of silica gel, grain diameter 1000μ, which was covered by an aminopropyl phase; thereabove, again a high-grade steel Sulzer packing was provided.

The residue now contained, as illustrated in FIG. 3,

20:4 0.9% by weight
20:5 15.9% by weight
22:5 5.1% by weight
22:6 34.3% by weight.

At the temperature and pressure adjustment of the carbon dioxide used as solvent mentioned above, essentially the acids having a number of carbon atoms of up to, but not above, 18 are soluble. However, the section of the pure extraction is not sharp. There are still acids having shorter molecules in the residue, as can be seen from FIG. 2; visa versa, acids having longer-chained molecules have been taken along into the extract, as can be seen from the comparison with the absorption-supported extraction of the higher contents of the acids considered above which were obtained in the second experiment.

In FIG. 3, the remaining peaks have partially larger areas corresponding to the increased contents. It can also be seen that, in the combination with the use of the sorbent, the extraction section has become significantly sharper. Smaller molecules with less than 18 carbon atoms are essentially no longer detectable. The absorbed molecules do not burden the separation process and are not taken along into the solution. The action of the solvent is less impeded.

EXAMPLE 2

A highly concentrated eicosapentene acid was separated from a fish oil concentrate composed primarily of palmitic acid (16:0), palmitoleic acid (16:1) and eicosapentene acid (20:5), as illustrated in the gas chromatogram of FIG. 4.

After a transesterification in ethyl ester in supercritical $CO_2$, the fish oil concentrate was conducted through a column having a height of 110 cm and a diameter of 10 cm, wherein the column was provided with a packing with silica gel, grain diameter 1000μ, and covered by an aminopropyl phase. The $CO_2$ flow was 160 kg/h at 40° C. and 110 bars.

In four experiments, quantities of 70 ml, 200 ml, 260 ml and 400 ml were conducted into the $CO_2$ flow over the column.

The extracted substances were collected in 20 fractions.

The results are shown in FIG. 5.

As analyses of the individual fractions demonstrate, primarily 16:0 is extracted at the first peak (peak after 2 minutes) extending from fraction No. 1 to No. 3, and primarily 16:0, 16:1 and 20:4 are extracted at the second peak (peak after 6 minutes) extending from No. 4 to No. 6.

When the quantity added is 70 ml, the analysis remains purely 16:0 up to fraction No. 2; an overlap with the second peak occurs only at No. 3. When the quantity added is 200 ml, the overlap with the second peak becomes greater and, when 260 ml are added, the overlap is even greater; when 200 ml are added, only the first fraction is purely 16:0, and, when 260 ml are added, the fraction is even smaller.

In contrast, when the quantity added is increased, a third peak is formed progressively after the second peak. In the case of the addition of 70 ml and 200 ml, the third peak is only indicated at fraction No. 7; when 260 ml are added, the third peak is pronounced and already includes No. 8 to a small extent; when 400 ml are added, the third peak extends strongly pronounced from No. 7 to No. 13 (17th to 25th min.). At this point, predominantly 20:5 is extracted; starting at No. 13, as indicated as a range, 20:5 is extracted together with 22:6, wherein 22:6 predominates at the end.

Figure 6:
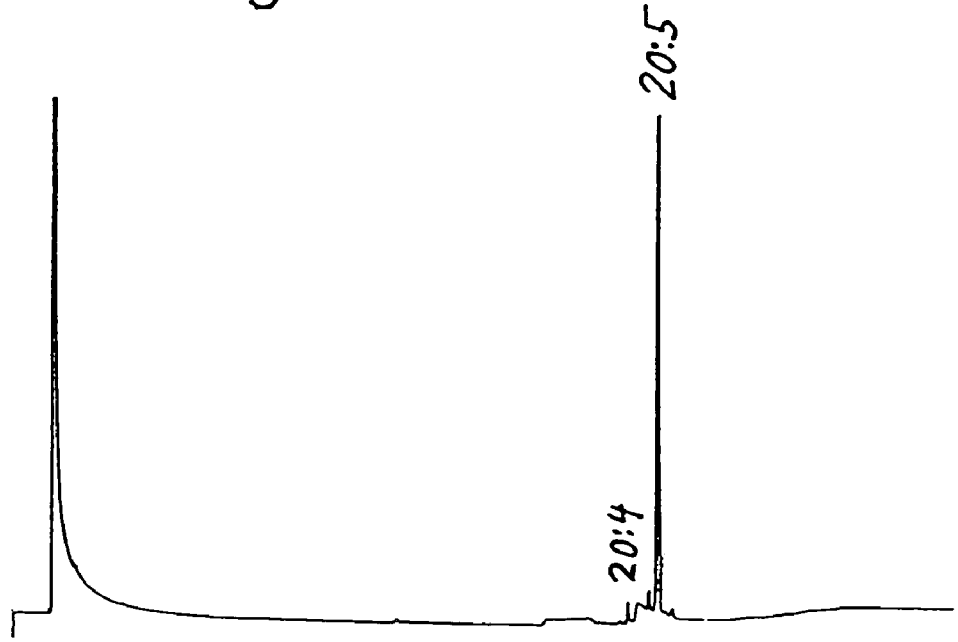

In the case of an addition of 400 ml, the fractions No. 7 through No. 15, identified as a range in FIG. 5, the total portion of 20:5 is above 90%. FIG. 6 shows this in a gas chromatogram.

In view of the preparative object, this means an extremely favorable ratio between the obtained quantity and the degree of concentration. In only one work step, from the fish oil concentrate containing approximately 60% 20:5, 51% of the quantity of 20:5 with a concentration of 92% have been recovered.

The extraction profiles of FIG. 5 can be interpreted as follows:

The addition quantity of 70 ml is entirely within the scope of the chromatography; in order to carry out a pure chromatographic separation, the addition would have been limited to approximately 30 ml. With progressing overburdening, the existing selectivity of the chromatography is lost. The second and first peaks move closer together and overlap to a greater extent. The overlap is illustrated in broken lines.

However, a surprising improvement of the selectivity occurs between the third peak and the second peak, i.e., between 20:5 and the previously extracted fatty acids. At this point, the above-mentioned effects come into play: the expanding effects of the qualitatively progressing extraction and the chromatography converge; in addition, the aminopropyl phase holds to a significant extent the long-chained fatty acids with the large number of double bonds and, accordingly, delays the extraction of these fatty acids.

The fact that the third peak is formed especially only when the overburdening is greater may be explained in such a way that the locations of the occupation phase which are active with respect to bonding are occupied almost completely only by the most strongly attracted, long-chained, highly unsaturated fatty acids and, thus, a chromatographic capacity for the molecules with lower affinity is no longer available.

EXAMPLE 3

Figure 7:
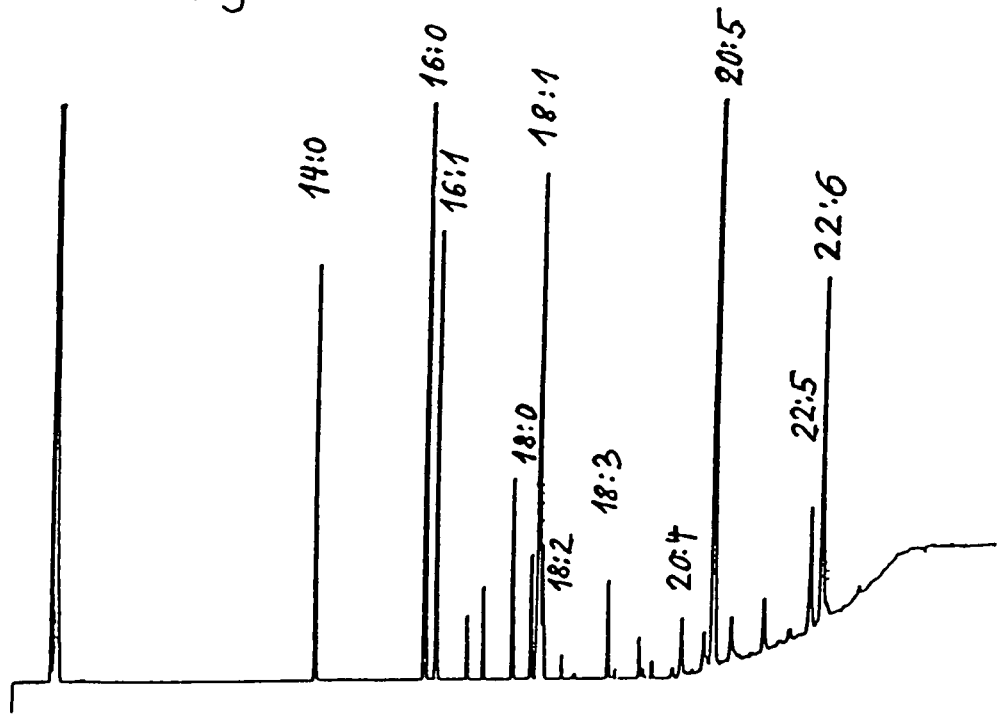
Figure 8:
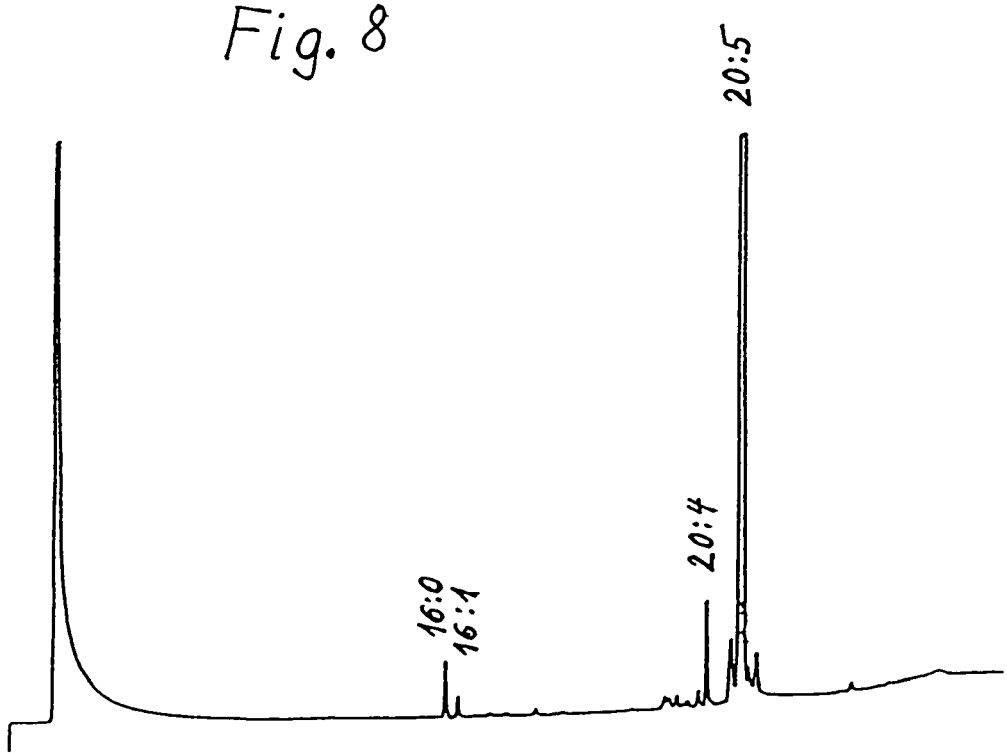

A sardine oil ethyl ester similar to the fish-liver oil ethyl ester of FIG. 1 was treated in the same manner as in example 2 with the quantity added being 400 ml. The gas chromatogram of the sardine oil ethylester is shown in FIG. 7.

The resulting extraction profile was similar to that of FIG. 5. However, the peak containing the predominant quantity of 20:5 occurred later and was shorter in accordance with the greater portion of fatty acids having shorter chain lengths. Six fractions were collected from the 21st to the 25th minute, wherein the total concentration of 20:5 was 91%.

The various features of novelty which characterize the invention are pointed out with particularity in the claims annexed to and forming a part of the disclosure.

We claim:

1. A process for extracting a substance or a substance group from a mixture, wherein the process utilizes a solvent for separation, the process comprising treating the mixture with the solvent in the presence of a sorbent as stationary phase, thereby conducting the solvent past the sorbent in a column in a co-current flow with the mixture, such a quantity of the mixture being added to the solvent prior to the entrance of the solvent into the column that the mixture initially forms a plug in the column of at least 2 percent of the column length and subsequently progressively dissolves, and selecting the solvent and the sorbent such that a holding effect of the sorbent at least one of supports the separation by the solvent during the dissolving procedure and subsequently supplements the separation by interacting with the solvent as mobile phase.

2. The process according to claim 1, comprising separating the fraction by extraction into two fractions by using a solvent which selectively dissolves only one substance or substance group.

3. The process according to claim 1, comprising adding the mixture with the use of a solvent which dissolves the substances or substance groups to be separated at different speeds, and separating the mixture into several fractions in a co-current flow with the solvent.

4. The process according to claim 1, comprising carrying out the process by means of a column having a framework on which the sorbent is deposited.

5. The process according to claim 1, comprising utilizing a liquid or supercritical medium as the solvent.

6. The process according to claim 5, wherein the medium is carbon dioxide.

7. The process according to claim 3, for obtaining unsaturated fatty acids or compounds of unsaturated fatty acids, comprising utilizing a sorbent which has on at least one group of its molecule or its molecules at least one pair of free electrons and/or which has in its molecule or in its molecules at least one multiple bond, further comprising, after passage of a possibly saturated fatty acid or fatty acid compound having the same number of carbon atoms through the column, collecting the fatty acids and/or fatty acid compounds by themselves or in an enriched mixture.

8. A process for extracting a substance or a substance group from a mixture, wherein the process utilizes a solvent for separation, and wherein the mixture has a greater specific weight than the solvent, the process comprising treating the mixture with the solvent in the presence of a sorbent as stationary phase, conducting the solvent past the sorbent in a counter-current flow against the mixture, and selecting the solvent and the sorbent such that a holding effect of the sorbent at least one of supports the separation by the solvent during the dissolving procedure and subsequently supplements the separation by interacting with the solvent as mobile phase.

9. The process according to claim 8, comprising separating the fraction by extraction into two fractions by using a solvent which selectively dissolves only one substance or substance group.

10. The process according to claim 9, comprising continuously separating the mixture into two fractions.

11. The process according to claim 8, comprising adding the mixture with the use of a solvent which dissolves the substances or substance groups to be separated at different speeds, and separating the mixture into several fractions in a co-current flow with the solvent.

12. The process according to claim 8, comprising carrying out the process by means of a column having a framework on which the sorbent is deposited.

13. The process according to claim 8, comprising utilizing a liquid or supercritical medium as the solvent.

14. The process according to claim 13, wherein the medium is carbon dioxide.

15. The process according to claim 8, for obtaining unsaturated fatty acids or compounds of unsaturated fatty acids, comprising utilizing a sorbent which has on at least one group of its molecule or its molecules at least one pair of free electrons and/or which has in its molecule or in its molecules at least one multiple bond, further comprising, after passage of a possibly saturated fatty acid or fatty acid compound having the same umber of carbon atoms through the column, collecting the fatty acids and/or fatty acid compounds by themselves or in an enriched mixture.

16. A process for extracting a substance or a substance group from a mixture, wherein the process utilizes a solvent for separation, and wherein the mixture has a greater specific weight than the solvent, the process comprising treating the mixture with the solvent in the presence a sorbent as stationary phase, conducting the solvent past the non-moving mixture and the sorbent, and selecting the solvent and the sorbent such that a holding effect of the sorbent at least one of supports the separation by the solvent during the separation and subsequently supplements the dissolving procedure by interacting with the solvent as mobile phase.

17. The process according to claim 16, comprising separating the fraction by extraction into two fractions by using a solvent which selectively dissolves only one substance or substance group.

18. The process according to claim 16, comprising adding the mixture with the use of a solvent which dissolves the substances or substance groups to be separated at different speeds, and separating the mixture into several fractions in a co-current flow with the solvent.

19. The process according to claim 16, comprising carrying out the process by means of a column having a framework on which the sorbent is deposited.

20. The process according to claim 16, comprising utilizing a liquid or supercritical medium as the solvent.

21. The process according to claim 20, wherein the medium is carbon dioxide.

22. The process according to claim 16, for obtaining unsaturated fatty acids or compounds of unsaturated fatty acids, comprising utilizing a sorbent which has on at least one group of its molecule or its molecules at least one pair of free electrons and/or which has in its molecule or in its molecules at least one multiple bond, further comprising, after passage of a possibly saturated fatty acid or fatty acid compound having the same number of carbon atoms through the column, collecting the fatty acids and/or fatty acid compounds by themselves or in an enriched mixture.

* * * * *